(12) United States Patent
Brlenic et al.

(10) Patent No.: US 6,418,196 B1
(45) Date of Patent: Jul. 9, 2002

(54) METHOD AND SYSTEM IN TELECOMMUNICATIONS SYSTEM

(75) Inventors: Robert Brlenic, Enskede; Jens Lundstr Öm, Bromma; Aleksander Marlevi, Spånga, all of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/543,115

(22) Filed: Apr. 5, 2000

Related U.S. Application Data

(63) Continuation of application No. PCT/SE98/01778, filed on Oct. 2, 1998.

(30) Foreign Application Priority Data

Oct. 6, 1997 (SE) .............................................. 9703633

(51) Int. Cl.$^7$ .......................... H04M 1/24; H04M 3/08; H04M 3/22
(52) U.S. Cl. .................. 379/32.04; 379/1.01; 379/199; 379/201.12; 370/248; 370/252
(58) Field of Search ............................ 379/1, 9, 10, 15, 379/27, 34, 52, 67.1, 343, 347, 114, 144, 201.01, 201.12, 207.04, 199; 381/68.2, 68.4, 94, 101, 102, 103; 370/248, 252

(56) References Cited

U.S. PATENT DOCUMENTS

| | | | |
|---|---|---|---|
| 5,400,395 A | | 3/1995 | Berenato ..................... 379/114 |
| 5,420,914 A | | 5/1995 | Blumhardt .................. 379/114 |
| 5,485,455 A | * | 1/1996 | Dobbins et al. .............. 370/60 |
| 5,539,806 A | | 7/1996 | Allen et al. .................... 379/52 |
| 5,634,006 A | * | 5/1997 | Baugher et al. ....... 395/200.06 |
| 5,737,389 A | * | 4/1998 | Allen .............................. 379/1 |
| 5,809,110 A | * | 9/1998 | Ulrich et al. .................. 379/30 |
| 5,892,754 A | * | 4/1999 | Kompella et al. .......... 370/236 |
| 5,999,525 A | * | 12/1999 | Krishnaswamy et al. ... 370/352 |
| 5,999,598 A | * | 12/1999 | Henrick et al. .......... 379/93.07 |
| 6,005,926 A | * | 12/1999 | Mashinsky ................... 379/114 |
| 6,144,727 A | * | 11/2000 | Mashinsky ................... 379/112 |
| 6,157,648 A | * | 12/2000 | Voit et al. .................... 370/401 |
| 6,295,294 B1 | * | 9/2001 | Odlyzko ..................... 370/389 |

FOREIGN PATENT DOCUMENTS

| | | | |
|---|---|---|---|
| EP | 0 544 635 | 6/1993 | ........... H04Q/7/04 |
| EP | 0 608 066 | 7/1994 | ......... H04Q/3/545 |
| EP | 0 705 016 | 4/1996 | ........... H04M/3/40 |
| EP | 0 751 662 | 1/1997 | ......... H04M/15/00 |
| EP | 0 899916 A2 * | 3/1999 | ........... H04L/12/56 |
| GB | 2 311 439 | 9/1997 | ........... H04L/12/56 |
| JP | 01082751 | 3/1989 | ............ H04M/7/00 |
| JP | 01149564 | 6/1989 | .......... H04M/11/00 |
| JP | 02192254 | 7/1990 | ......... H04M/1/00 |
| WO | 88/07797 | 10/1988 | ......... H04M/15/00 |
| WO | 94/28683 | 12/1994 | ........... H04Q/3/00 |

* cited by examiner

*Primary Examiner*—Binh Tieu
(74) *Attorney, Agent, or Firm*—Burns, Doane, Swecker & Mathis, L.L.P.

(57) ABSTRACT

A user of a telephone service selects the quality level of a connection by manually specifying the desired quality level, automatically setting up the call with the specified quality level. To assist the user when selecting the quality, a voice sample of the user or a pre-recorded voice sample with specified quality levels may be played back to the user as a reference before the selection of a quality level. Alternatively, the user may be informed about transmission parameters associated with specified quality levels before the selection of a quality level. The method may be carried out by a service control point and a service switching point in a telecommunication network.

9 Claims, 2 Drawing Sheets ial Appli-
METHOD AND SYSTEM IN TELECOMMUNICATIONS SYSTEM

This application is a continuation of International Application No. PCT/SE98/01778 filed on Oct. 2, 1998, which designates the United States.

TECHNICAL FIELD

The present invention relates to the quality of telecommunication connections, and more specifically to the selection of quality by the subscriber.

BACKGROUND

At present, a user in a telephone network is not able to choose the level of quality of a connection to be set up. For some connections a high quality may be important, or desirable, whereas for other connections a poorer quality may be acceptable. If the quality levels are associated with different cost levels, the selection of quality levels may enable the users in a telephone network to affect their telephone costs.

Different types of telecommunication networks, in addition to the traditional Public Services Telephone Network (PSTN), are being used to an increasing degree. The standard quality of the connections varies between the networks. For example, most mobile telephone networks use a lower bandwidth than the PSTN network. When making calls between different networks, it may be desirable to adapt the quality of the whole connection to the part of the connection having the poorest quality level. In this way, the subscriber can save money, and network resources may be used in a more efficient way.

For data connections, parameters such as bandwidth and bit error rate may be important when selecting the quality needed for a connection.

U.S. Pat. No. 5,400,395 describes a system for selecting a telephone line for a connection. Information about the rates for different carriers is stored in a database. When a call is to be made, the information in the database is checked and the lowest cost carrier is selected.

U.S. Pat. No. 5,420,914 describes a system for automatically selecting the least expensive telephone line for a connection.

International patent application WO 88/07797 describes a device to be used with ordinary telephones for selecting one of a number of carriers for telephone connections. It is mentioned that the least expensive carrier may not always be selected, for quality reasons. As the invention involves a device to be connected to the telephone, it only works with traditional PSTN telephones.

None of the three above mentioned documents describes how to determine the quality of a connection in advance.

SUMMARY

It is an object of the present invention to enable a person making a phone call to select the quality of service.

It is another object of the present invention to enable a people to influence the cost of making telephone calls.

It is still another object to enable a user in a telephone network to get information about the quality levels available for telephone connections.

It is yet another object of the invention to enable the selection of the quality of service before the call is made or during the call.

These and other objects are achieved according to the invention by a method for enabling a user of a telephone service to select the quality level of a connection, said method comprising the following steps:

manually specifying the desired quality level, automatically setting up the call with the specified quality level.

To assist the user when selecting the quality, a voice sample of the user or a prerecorded voice sample with specified quality levels may be played back to the user as a reference before the selection of a quality level. Alternatively, the user may be informed about transmission parameters associated with specified quality levels before the selection of a quality level.

A service control point for carrying out said method in a telecommunication network is also disclosed, said service control point comprising:

means for receiving information from a service switching point about the desired quality of service for a connection in the telecommunications network, and means for instructing the SSP to adjust the quality of service of a connection in the telecommunications network.

A service switching point in a telecommunication network is also disclosed, said service switching point being adapted to receive instructions from a user as to the desired quality of a connection, forward the instructions received from the user to the SCP 9 receive instructions from the SCP 9 and set up or change the connection in accordance with the instructions received from the SCP.

The invention offers the following advantages: Users in a telecommunication network are enabled to select the connection quality and affect their telephone costs.

The invention may be used with any kind of telephone, including mobile telephones, computer based telephones and coin telephones.

DETAILED DESCRIPTION

Figure 1:
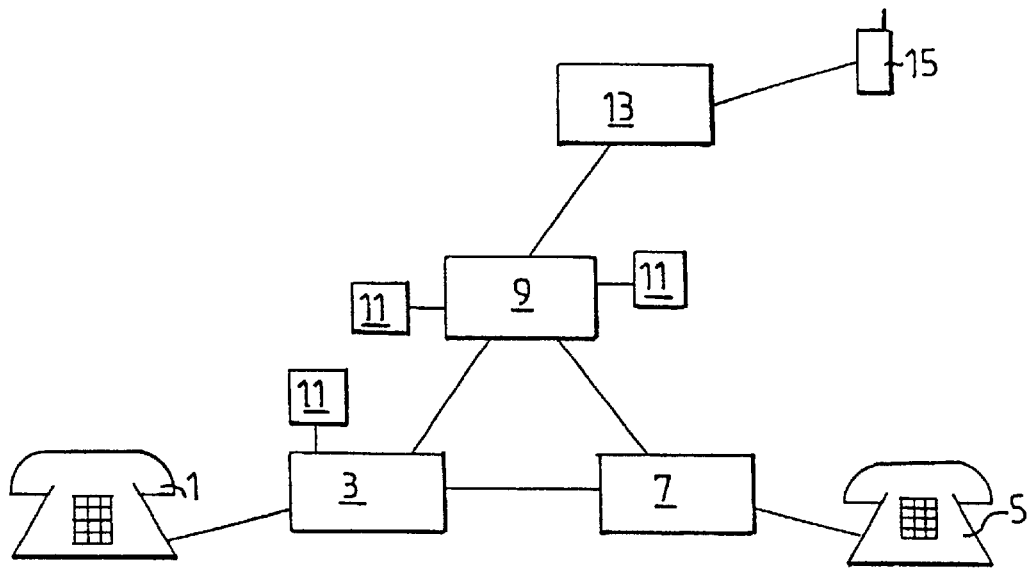
FIG. 1 shows an intelligent network for carrying out the method according to the invention.

FIG. 1 shows an intelligent telecommunication network in which the invention has been implemented. A first subscriber 1 is connected to a first Subscriber Switching Point (SSP) 3 and a second telephone subscriber 5 is connected to a second SSP 7. The SSPs 3,7 are interconnected and both SSPs 3,7 are connected to a Service Control Point (SCP) 9. The SSPs 3,7 perform the switching functions in the network, and the SCP 9 performs the control functions. The SCP 9 may also comprise databases and other information. One or more Intelligent Peripheries (IP) 11 may be connected to the SCP 9 and/or SSPs 3,7. The IPs 11 comprise support information used by the SCP 9 when determining how a call is to be handled.

When, for example, the first subscriber 1 lifts the hook, the SSP 3 detects that the call should be handled in a special way, and requests instructions from the SCP 9. According to the invention, the SCP 9 instructs the SSP 3 that the subscriber 1 may select the quality of the line for the call that he is about to make. The subscriber 1 may first listen to samples of the quality, as will be explained in detail below, or may select a quality level directly. When the subscriber 1 has selected a quality level and dialled a number, for example to the second subscriber 5, in a conventional way, the SSP 3 will set up the call between the first 1 and the second 5 subscriber with the selected quality level.

The subscriber 1 may be allowed to select a quality level in several different ways: The selection may be made using the telephone keypad without any instruction. A voice prompt from the network may inform the user about the current quality level and about other quality levels available and how to select them. If the subscriber's 1 telephone has a display, the quality level information may be shown on the display, and the subscriber may be allowed to choose from a menu, using any standard keys, including function keys, arrow keys, and so on. The menu may allow a choice of standard settings, or it may allow the subscriber to set a number of parameters as desired, for example, bit error rate and bandwidth. The subscriber may also be informed, by voice or on the display, about the cost of each quality level.

Of course, the selection may be made from a separate selection unit connected to the phone. This is, however, more complicated and will not add any more functionality to the inventive apparatus. Such a selection unit is therefore not shown or described in detail.

Other types of networks may be connected to the intelligent network used in the invention. Shown in FIG. 1 is a Mobile Services Switching Centre (MSC) 13 to which a number of mobile subscribers 15 are connected. For simplicity, the connection from the mobile subscriber 15 to the MSC 13 is shown as a simple line. The subscribers are of course connected to the network using radio links and base stations. The MSC 13 is connected to the SCP 9 and is able to access the SCP functions, including the inventive functions, in the same way as the SSPs 3, 7.

It would be desirable to use this service from private branches as well which will not be possible in the normal case, as each individual subscriber in the private branch is not visible to the SSP. One solution to this problem would be to allow the subscriber to identify himself to the SCP 9 using an identification code or the like.

As will be obvious to the skilled person, the shown configuration is only an example. The subscribers 1,5 may be connected to the same SSP, or more exchanges may be present in the network Also, other networks, such as Integrated Services Digital Networks (ISDN) and/or data networks may be connected to the network. The ISDN exchange must then be connected to the SCP 9 in the same way as the SSPs 3, 7, in order to be able to access the inventive functions.

If the call is made to a subscriber in a network with a different default quality level than the network to which the subscriber is connected, or if the call passes through a number of different networks the poorest quality level may be selected. For example, the quality of the transmission in mobile telephony networks is generally poorer than the quality in a Public Services Telephone Network (PSTN). If, for example, a data connection is to be set up, the highest level of quality may be selected to ensure a correct transmission of data. The different quality levels may be associated with different rates.

If, during the call, one of the parties 1, 5 to the connection wishes to change the level of quality, he informs the SSP 3,7, preferably by pressing a key or a number of keys on the telephone. According to an embodiment of the invention the call is then put on hold while the subscriber 1,5 selects a new level of quality and automatically resumed afterwards. According to another embodiment the connection is kept while the level is changed. Preferably, the party responsible for the increase in quality will pay the cost resulting from the increase. If the quality increase is initiated by the called party, this means that the cost for the call will be divided between the parties to the connection.

After the call is finished, the quality level used in the last call may be kept, or a default quality level may be restored.

Figure 2:
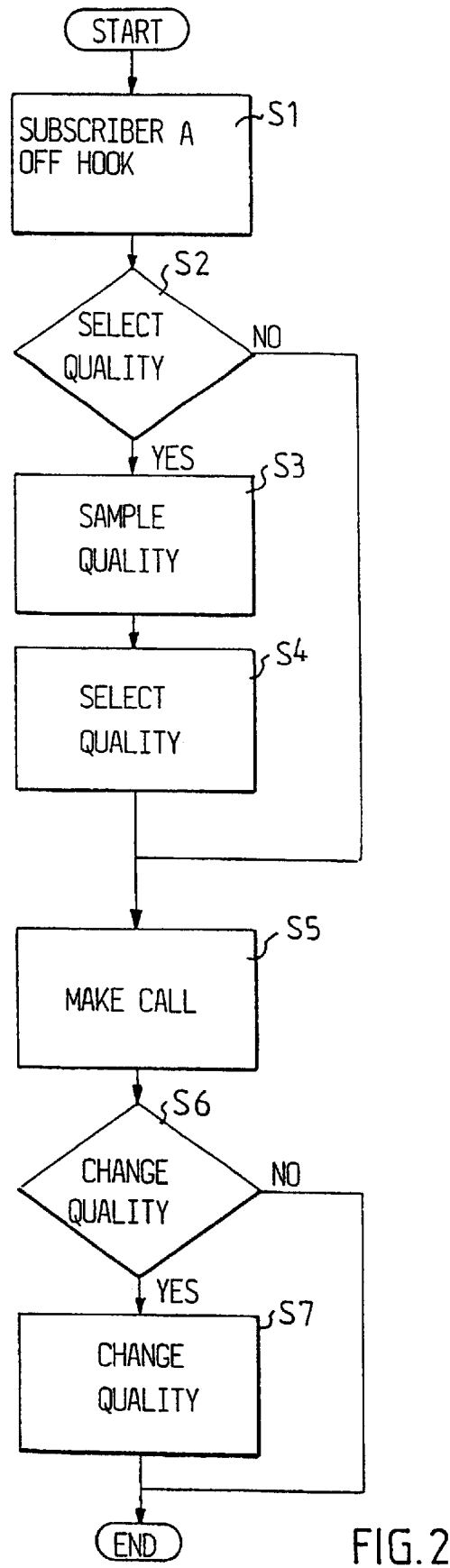
FIG. 2 is a flow chart of the inventive method.

FIG. 2 shows the actions taken when a phone call is made according to the invention.

Step S1: The subscriber lifts the hook. The SSP detects that the subscriber is allowed to select the level of quality.

Step S2: Should a new level of quality be set? If yes, go to step S3; if no, go to step S5.

Step S3: The subscriber is allowed to listen to different quality levels to determine the desired level of quality. This step is optional.

Step S4: The subscriber selects a level of quality. This may be done, for example, by pressing buttons as prompted by the network.

Step S5: The subscriber dials the number in a conventional way. The SSP sets up the call with the level of quality that was specified in step S4.

Step S6: If one of the parties to the call wishes to change the quality level during the call, go to step S7, otherwise end of procedure.

Step S7: Either one of the subscribers may change the level of quality by pressing a predetermined combination of keys on the telephone. For example, pressing a key or a combination of keys may cause the network to prompt a new selection of the level of quality, by a voice message informing the subscriber about the current quality level and what keys to press to change it.

Of course it would be possible to select the quality level before the subscriber lifts the hook, that is, step S1 could be placed just before step S5. With ordinary telephones it would then not be possible to sample the quality level before selecting. If an Internet Protocol (IP) telephone or another computer is used as a telephone, files comprising sound samples of different quality levels could be stored in the computer memory and played back when desired without lifting the hook.

In step S3, the subscriber may be allowed to sample the quality levels in several different ways: According to one embodiment of the invention, a voice sample given by the subscriber may be transmitted through the network using the appropriate quality of service and fed back to the subscriber who can then hear the result. According to another embodiment, voice samples may be stored in the network, for example in the SCP 9 or in an IP 11, and played back to the subscriber. According to a third embodiment, the subscriber may be informed about certain quality parameters, such as bits per second, bit error rate, the bandwidth covered, and so on. Of course all three embodiments may be implemented and the subscriber may be allowed to choose.

As mentioned above, if a computer, for example, an IP telephone or a Computer Telephony Integration (CTI) telephone is used, the voice samples and/or parameters associated with the different quality levels may be stored in the computer's memory and played back or displayed when desired without setting up a connection to the telephone network.

In a conventional intelligent network, the SCP 9 only instructs the SSP 3, 7 to select the number to which the connection should be set up, and not a particular route to this number through the network. According to the invention, it is necessary for the SSP 3,7 to be able to select a route through the network, to provide the desired quality of service.

Figure 3:
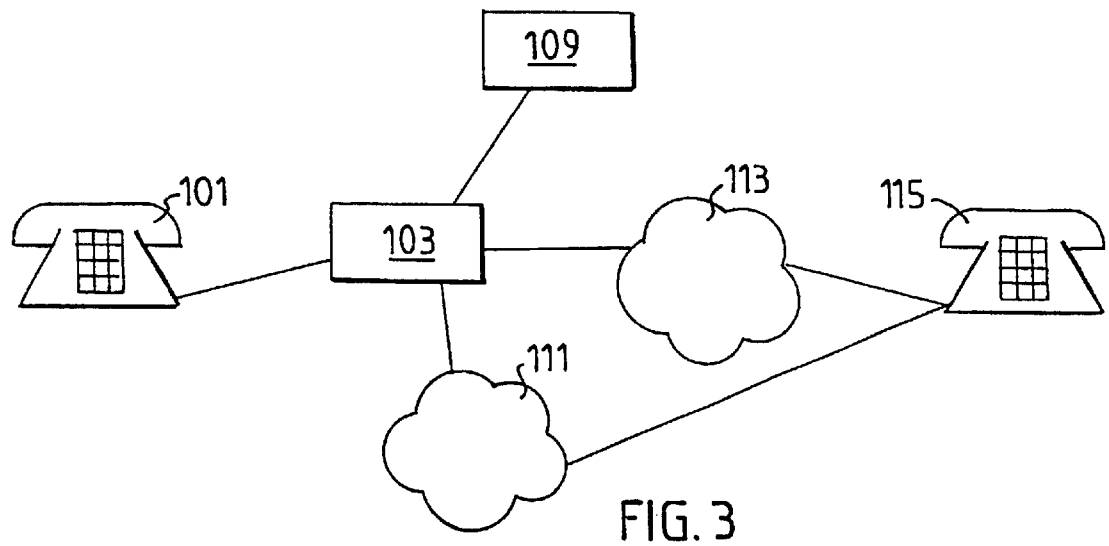
FIG. 3 shows an intelligent network according to one embodiment of the invention.

This may be solved as described below, with reference to FIG. 3. A first subscriber 101 is connected to a first SSP 103, which is in turn connected to an SCP 109, in the same way as in FIG. 1. The SSP 103 is also connected to two networks, 111, 113, each associated with a specific quality level. A second subscriber 115 is connected to both networks 111, 113, possibly through an exchange or the like (not shown). As will be obvious to the skilled person, an arbitrary number of networks may be connected to the SSP 103.

In this example, the first subscriber 101 wishes to call the second subscriber 115. When the SSP 103 receives the call, the call is intercepted and the SSP requests instructions from the SCP.

Each quality level is associated with a number or a code. When the SCP 109 instructs the SSP 103 to set up the connection, the SCP 109 also transmits the code signifying the desired quality level. Depending on the quality level the SSP will then select an appropriate network through which the call will be routed to achieve the desired quality of service.

What is claimed is:

1. A method for enabling a user of a telephone service to select the quality level of a connection, comprising the steps of:
   manually specifying the desired quality level;
   automatically setting up a call with the specified quality level;
   informing said user about the quality level of at least one connection alternative before the specification of the desired quality level; and
   playing back a voice sample of the user or a pre-recorded voice sample with specified quality levels as a reference before the selection of a quality level.

2. A method for enabling a user of a telephone service to select the quality level of a connection, comprising the steps of:
   manually specifying the desired quality level;
   automatically setting up a call with the specified quality level;
   informing said user about the quality level of at least one connection alternative before the specification of the desired quality level; and
   informing the user about transmission parameters associated with specified quality levels before the selection of a quality level.

3. A method for enabling a user of a telephone service to decide on a level of quality of a connection, comprising the step of:
   allowing a user to listen to a pre-recorded voice sample or a voice sample from the user, played back to the user with at least one connection level of quality.

4. The method according to claim 3, further comprising the following steps being repeated until the user specifies a quality level to be used in the connection:
   manually specifying the quality level to be considered, and
   playing back the pre-recorded voice sample, or the voice sample from the user, to the user with the desired quality.

5. A service control point in a telecommunication network, comprising:
   means for instructing a service switching point (SSP) that the quality of service for a connection in the telecommunication network may be selected;
   means for receiving information from the SSP about the desired quality of service for a connection in the telecommunications network; and
   means for instructing the SSP to adjust the quality of service of a connection in the telecommunications network.

6. The service control point according to claim 5, further comprising:
   means for instructing a service switching point in said telecommunications network to transmit a voice sample to a user in said telecommunications network with the quality of service specified by said user.

7. The service control point according to claim 5, further comprising:
   means for retrieving a voice sample stored in or in connection to said service control point,
   means for providing said service switching point with said voice sample.

8. A service switching point in a telecommunication network, comprising:
   means for receiving information from a service control point (SCP) that the quality of service for a connection in the telecommunication network may be selected;
   means for receiving instructions from a user as to the desired quality of a connection;
   means for forwarding the instructions received from the user to the SCP;
   means for receiving instructions from the SCP; and
   means for setting up or changing the connection in accordance with the instructions received from the SCP.

9. The service switching point according to claim 8, further comprising means for, upon instructions from the SCP,
   transmitting a voice sample to a user in said telecommunications network with the quality of service specified by said user.

* * * * *